Dec. 4, 1928.  1,693,687
E. WILDHABER
METHOD OF PRODUCING GEARS
Filed Dec. 30, 1924  4 Sheets-Sheet 1
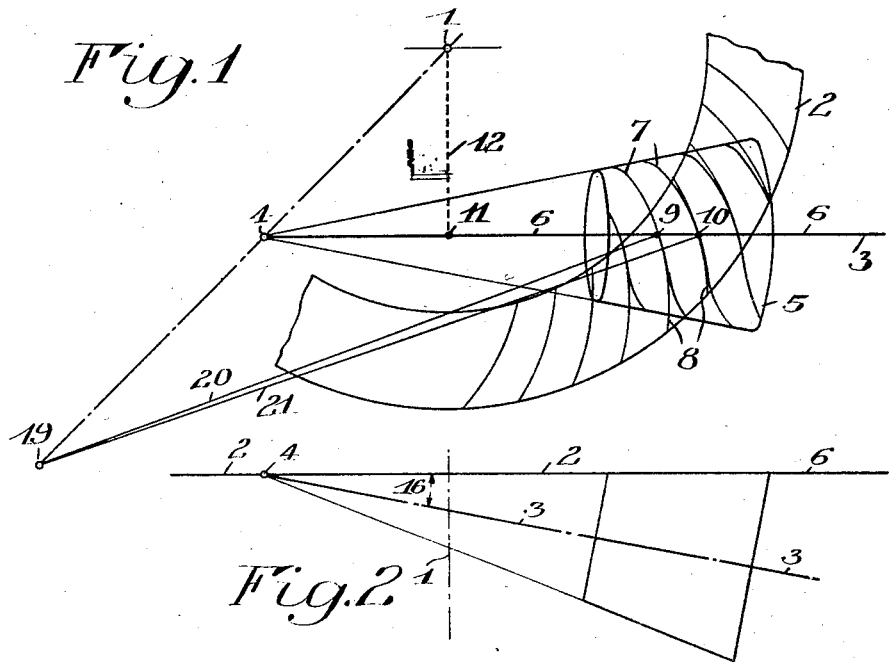
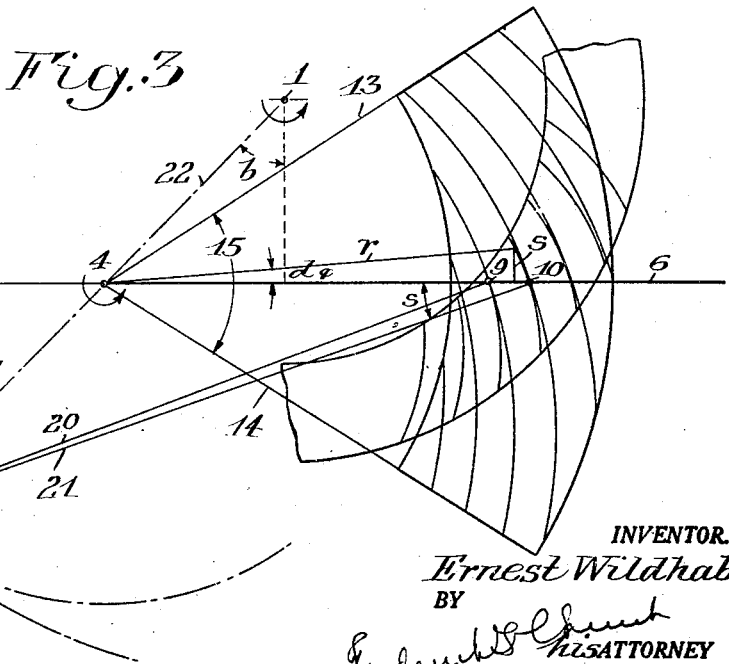
INVENTOR.
Ernest Wildhaber
BY
his ATTORNEY Dec. 4, 1928.                                                           1,693,687
E. WILDHABER
METHOD OF PRODUCING GEARS
Filed Dec. 30, 1924          4 Sheets-Sheet 2

INVENTOR.
Ernest Wildhaber
BY
His ATTORNEY

Dec. 4, 1928.                                                    1,693,687
E. WILDHABER
METHOD OF PRODUCING GEARS
Filed Dec. 30, 1924          4 Sheets-Sheet 3

INVENTOR.
Ernest Wildhaber
BY
his ATTORNEY

Dec. 4, 1928.  
E. WILDHABER  
1,693,687  
METHOD OF PRODUCING GEARS  
Filed Dec. 30, 1924  
4 Sheets-Sheet 4
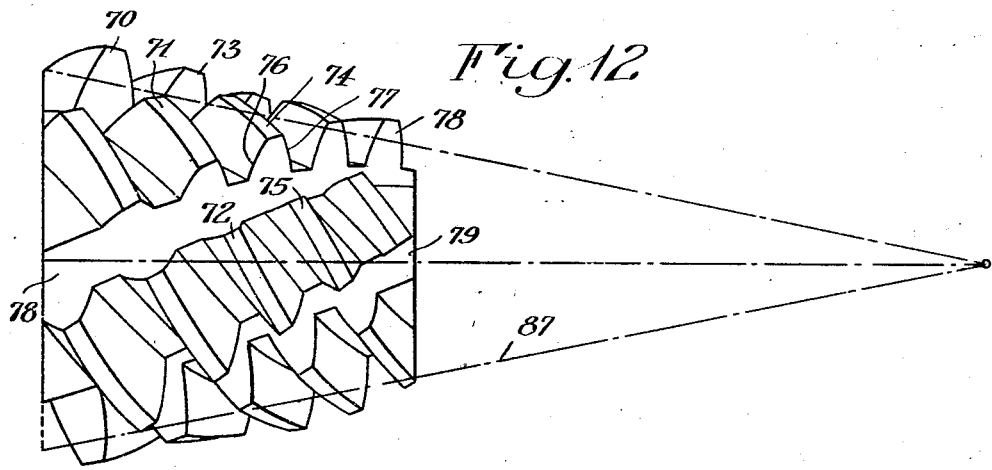
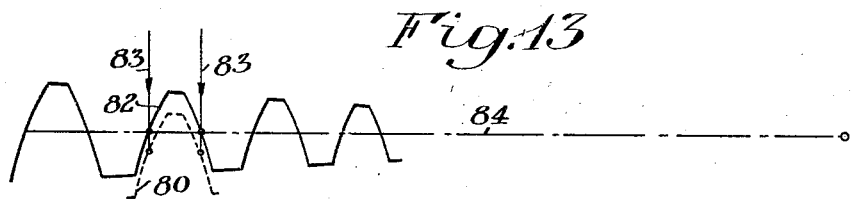
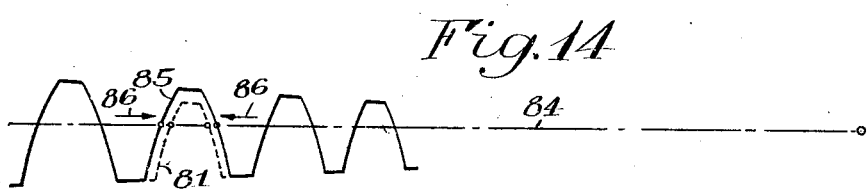
Inventor  
*Ernest Wildhaber*  
his Attorney Patented Dec. 4, 1928.

1,693,687

UNITED STATES PATENT OFFICE.

ERNEST WILDHABER, OF ROCHESTER, NEW YORK, ASSIGNOR TO GLEASON WORKS, OF ROCHESTER, NEW YORK, A CORPORATION OF NEW YORK.

METHOD OF PRODUCING GEARS.

Application filed December 30, 1924. Serial No. 758,861.

This invention relates to methods of producing gears, one object of the invention being to provide an efficient method for hobbing curved tooth tapered gears having the speed, economy and other advantages characteristic of hobbing processes. A further object is to provide an advantageous method of this nature adapted for cutting curved tooth tapered gears of a variety characterized by pitch line curvature and spiral angle of the desired moderate proportions.

To these and other ends the invention resides in certain improvements and combinations of parts, all as will be hereinafter more fully described, the novel features being pointed out in the claims at the end of the specification.

In the drawings:—

Figure 2 is an elevation of the same;

Figure 3 shows the pitch plane of the developed or crown gear and the pitch cone of the hub in development;

Figure 4 shows in development the preferred form of hob thread at the pitch line and meshing with the developed pitch surface of the gear to be cut or the pitch surface of the corresponding crown gear, the shaded portions representing sections through the teeth;

Figure 12 is a view of a complete hob for carrying out the present invention, and Figures 13 and 14 are views of a cutting face of the hob and illustrating two different methods of relieving the same.

Similar reference numerals throughout the several views indicate the same parts.

The preferred form of the method in accordance with the present invention, is carried out by a hob employed and its cutting edges are formed by gashes extending along lines which are curved both in the actual tool and in development and extending also perpendicularly to the threads. The hob thread will be first described in its general aspects and then with reference more particularly to the preferred embodiment thereof.

The thread of such a hob should preferably be able to mesh with a crown gear having identical pitch lines on the convex and concave sides of the teeth and the thread is preferably of a form which meshes with the blank to be cut in such a way that the pitch lines of the blank are produced by pitch lines of the hob.

Figure 1:
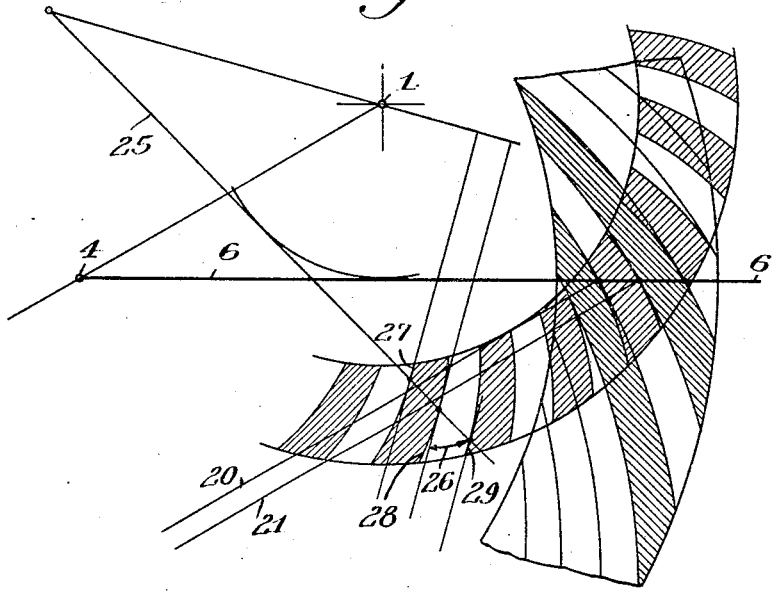
Figure 1 is a plan view showing the pitch surfaces of a hob and gear arranged in cutting relation in accordance with the invention, the gear being shown in development, or in other words, as a crown gear.

Referring more particularly to Figures 1 and 2, there is shown at 1 the axis of a basic crown gear having a pitch plane 2, representing the development of a gear to be cut. At 3 is the axis of a taper hob intersecting plane 2 at a point 4 which is the apex of the conical pitch surface 5 of the hub. Pitch surfaces 2 and 5 contact with each other in a line 6. At all points along this line 6, the pitch lines 7 of the hub thread match the pitch lines 8 of the teeth of the gear, or in other words, the pitch lines 7 and 8 contact in points such as 9, 10, of line 6 and the latter may be considered as the line of action between the two pitch surfaces. When the hob and gear are turned about their respective axes 3 and 1 at a fixed ratio, the contact points 9, 10, will travel along the line of action 6.

In the constructions heretofore employed, a contact point such as 9, 10, travels at a constant rate along the line of action 6, and the apex of the hob in such case must be located at a point 11 on a perpendicular 12 drawn from the gear center 1 to line 6, as follows from the relations and equations hereinafter explained.

It has been found however that such a line 6 may also be a line of action between two pitch surfaces where the apex of the hob does not lie at 11 on the perpendicular but has any other position such as 4 outside the perpendicular 12. A contact point 9, 10, will then travel at a changing rate along line 6 as hereafter explained. In other words, the hob will have a changing lead which has been found to afford several advantages as later described.

The mesh between the pitch plane 2 of the gear and the pitch cone 5 of the hob is maintained when the said pitch cone is developed into plane 2 of the gear. That is to say, the meshing action may be analyzed by development of cone 5 into the pitch plane 2 of the basic crown gear.

Figure 3 accordingly shows the pitch cone 5 of the hob developed in the pitch plane 2 of the crown gear, the hob development being included between the radii 13 and 14 making an angle 15 with each other. This angle 15 is equal to the product of 360° multiplied by the sine of the cone angle 16 of the hob (Figure 2). In this developed relation the crown gear and hob development mesh like two gears of parallel axes 1 and 4. There are accordingly two circles, as 17 and 18, which roll upon each other without sliding, which are ordinarily termed pitch circles and whose radii are in the inverse proportion of their respective angular velocities. It is preferred to employ an internal mesh as shown, one circle 18 rolling internally on the other circle 17, or, in other words, with the developed hob and crown gear turning in the same direction of revolution. Moreover the ratio in development, Figure 3, is preferably less than 5:1, the crown gear turning faster than 1/5 of the rate of the developed hob. As an example within the above general ratio, the dimensions of the circles 17 and 18 of Figure 3 correspond to a ratio of 1.8:1.

The ratio between the actual hob and its development is determined in the same way as the ratio between a bevel gear and its crown gear; that is, it corresponds to the sine of the cone angle. Let "$a_o$" represent the cone angle 16 of the hob "$N_o$" the number of its starts, and let "$a$" be the cone angle of the beveled gear blank and "$N$" its tooth number. The ratio between the hob and its development equals $\sin a_o$ and the ratio between the blank and the crown gear equals $\sin a$. It follows from what has been said, that the ratio $\frac{N}{N_o}$ between the blank and the actual hob is less than $$\frac{5 \sin a}{\sin a_o}.$$

Hence, $$\frac{\sin a_o}{\sin a}$$

is less than $$\frac{5 N_o}{N}.$$

It is preferred to employ a ratio of 1:1 between the crown gear and hob development, so that $$\frac{\sin a_o}{\sin a} = \frac{N_o}{N}.$$

It is well known in the art that in the case of a pair of gears of given center distance and ratio, the line of action may be assumed and the mate tooth profiles for such line of action then determined. Thus, in Figure 3, line 6 has been assumed as the line of action. This is not the usual line of action for an actual pair of gears since it passes through the center 4 of one of the gears whereas ordinarily the line of action passes through the contact point 19 of pitch circles 17 and 18. Nevertheless, the tooth profiles meshing along the line of action 6 are subject to the usual requirements. The profile perpendiculars 20, 21, at any points of contact 9, 10, must pass through contact point 19. This relation gives the inclination of the profile tangents for points at any distance from the centers 1 and 4 and the tooth profiles themselves may also be readily determined. From the above comparison of the mesh between the pitch surfaces 2 and 5 with the mesh between the tooth profiles of a pair of gears of parallel axes, it will be understood that the term "tooth profiles" as used in the above explanation applies to the pitch lines of hob and blank, that is to the longitudinal profiles of the tooth or thread.

It follows from the foregoing, therefore, that the pitch lines of a hob, or simply its thread spiral, should be such that perpendiculars to it at all the points of the straight line of action 6 pass through a single point 19. The setting of the hob is preferably such that the said point is situated in the line 22 connecting the apices of the gear and hob 1 and 4, respectively.

In the development, Figure 3, the convex pitch lines of the hob apparently interfere with the concave pitch lines of the crown gear. That is, although contacting in a point of the line of actions, the pitch lines appear to cut into each other on either side of the point of contact, since the concave pitch lines of the crown gear have a sharper curvature than the convex pitch lines of the hob. Such an interference appears in development only and not in actuality, when the pitch lines 7 are wrapped on a hob of suitable diameter.

The general equation of the thread spiral or pitch line of the hob is determined as follows, reference being had to Figure 3 of the drawings. Let "$s$" be the lead angle at a point 10 having a distance "$r$" from the apex 4 of the hob. Angle "$s$" also appears as the angle between line 6 and perpendicular 21.

Let $\phi$ be the polar angle, the differential of which, $d\phi$, is indicated in the drawings. It is then apparent that $dr = rd\phi \tan s$, and also $$\tan s = \frac{E \cos b}{r + E \sin b}$$

where E equals the distance from the center 4 to the point 19 and $b$ is the angle between line 22 and perpendicular 12. By substituting in the first of these equations the value for tan *s* obtained in the second, simplifying and integrating, it is found that $$\Phi = \frac{r}{E \cos b} + \tan b \log_{nat} r,$$

this being the general polar equation of hob spirals in development. It is preferred to use a hob thread which corresponds to $E = \infty$ (infinity) and the above equation then assumes the simpler form $\phi = \tan b \log_{nat} r$ which is the equation of a logarithmic spiral. Giving to E the value infinity means that the pitch circles 17 and 18 contact at a point 19 at an infinite distance in extension of line 22. The radii of these pitch circles thus become equal, since they differ only in the finite distance between the centers 1 and 4. In other words, the ratio between the crown gear and hob development is 1:1. The perpendiculars 20, 21 all become parallel to line 22 since they intersect the latter in the point 19 as infinity. The lead angle "*s*" therefore becomes constant and it has been found that a thread of constant lead angle is of great advantage, especially in the case of comparatively steep threads. Such threads may readily be ground on their relieved sides and they permit the use of a simple kind of spiral flutes, as further explained hereafter.

Figure 4 shows the preferred form of hob thread in development meshing with a developed bevel or crown gear. Figure 4 is similar to Figure 3 and here also the axis of the gear is indicated at 1, the apex of the hob at 4 and the line of action at 6. It is to be noted that, as explained above, the perpendiculars 20, 21 are parallel to each other and to the line joining centers 1 and 4. The shaded areas represent sections through the teeth of the gear and hob, the sections being taken along the pitch surfaces. The gear here shown is a development of the gear to be cut, the characteristics of which are best illustrated and disclosed in this manner.

Since the gear and hob match along the line of action 6, the pitch lines of the crown gear or of the bevel or other tapered gear in development have the same inclination as the pitch lines of the hob along this line. The pitch lines of the gear have therefore a constant inclination against line 6, or any other line 25, lying at the same distance from the center 1. Thus, the inclination angle 26 of the pitch lines 27, 28, 29, is constant.

Figure 6:
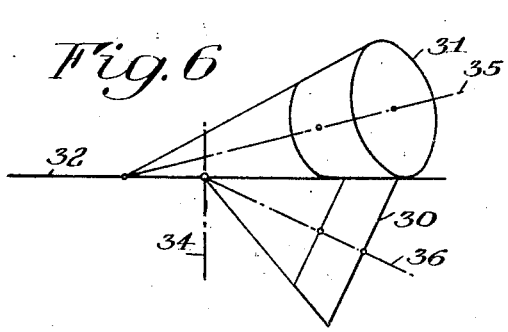
Figures 5 and 6 are a plan and elevation, respectively, illustrating the generation of a beveled pinion.
Figure 5:
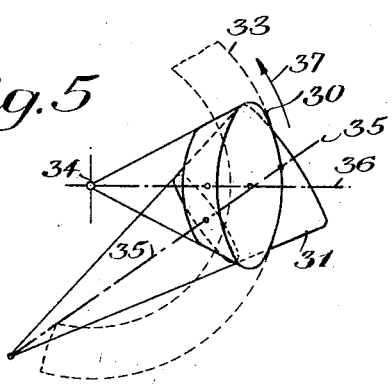

Figures 5 to 8 inclusive illustrate the generation of a pinion and mating gear. Figures 5 and 6 illustrate the generation of a bevel pinion 30, the pitch cone of which and of the hob 31 are placed in tangential relation to a plane 32 representing the pitch plane of a crown gear 33, Figure 5, having an axis 34. The hob and pinion blank are rotated in continuous cutting engagement in timed relation about axes 35 and 36, while an additional feeding motion between them is imparted about the apex of the blank, or axis 34, as well understood in the art. Preferably such relative feeding motion is accomplished by swinging the hob, but if desired such motion may be imparted to the blank instead or distributed between the hob and blank to accomplish this feeding or generating roll, as well understood in the art. The hob is fed in the direction 37, Figure 6, and is shown midway in its generating roll.

Figure 8:
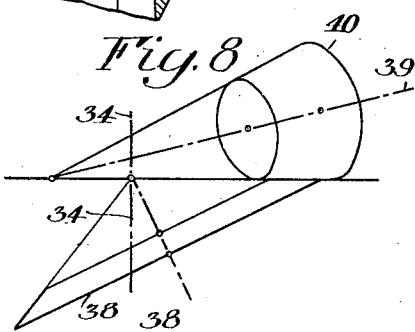
Figures 7 and 8 are a plan and elevation illustrating the method of generating a gear adapted to mate with the pinion of Figures 5 and 6.
Figure 7:
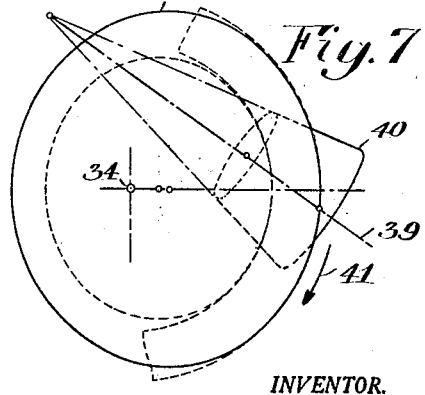

Figures 7 and 8 illustrate the generation of a mating gear 38 adapted to mesh with the pinion 30 of Figures 5 and 6. The axes 35 and 39 of hob 31 and 40, Figures 5 and 7, respectively, pass the axis 34 of the basic crown gear on opposite sides and hobs 31 and 40 are of opposite hand, as well understood in the art. Hob 40 is preferably fed in the direction of arrow 41 about the axis 34 of the basic crown gear.

Figure 9:
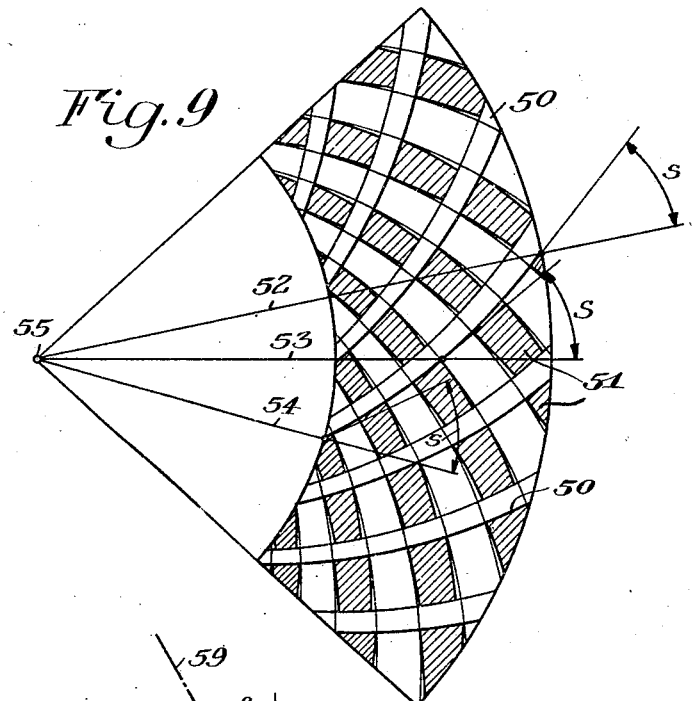
Figure 9 shows a development of the pitch cone of a hob for carrying out the present invention.

Figure 9 shows the developed pitch cone of the hob with its threads cut by flutes or gashes 50 to form the cutting teeth 51 appearing in section at the pitch lines. The gashes 50 extend as shown along curved lines and preferably along logarithmic spirals having the same inclination "*s*" at any radius 52, 53, 54, drawn from the apex 55 of the hob. Such gashes therefore are curved in actuality as well as in development. Since the thread of the hob also extends along logarithmic spirals and has therefore a constant spiral angle at any such radius 52, 53, 54, the angle between the thread and flute is constant for the whole length of the hob. This angle, furthermore, may be made a right angle, as shown in Figure 9, to thus insure equal and efficient cutting on both sides of the tooth. The actual hob is illustrated in Figure 12 and more particularly described hereafter.

Figure 10:
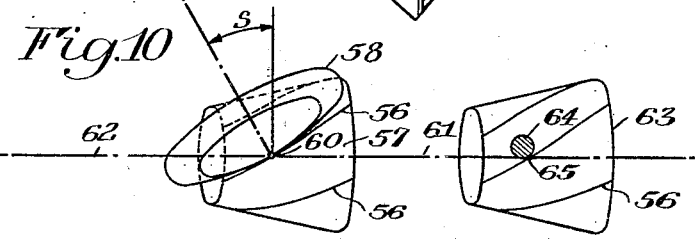
Figures 10 and 11 are a plan and elevation, respectively, illustrating the means and method of grinding the flutes of the hob.
Figure 11:
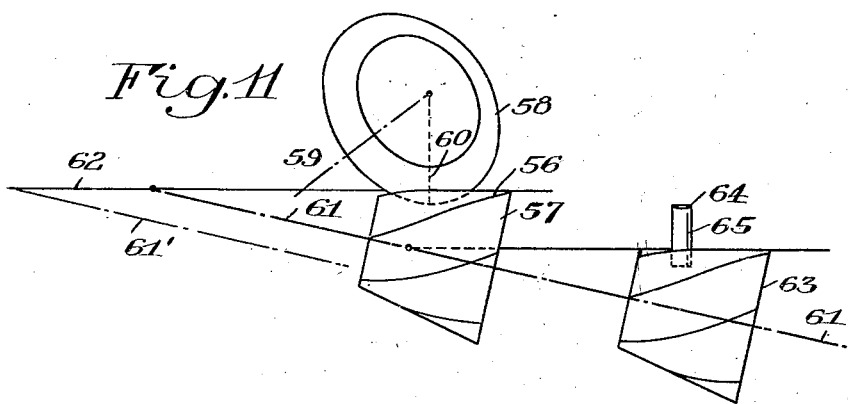

The novel taper hob with its curved flutes may be readily ground as for example by the means and methods illustrated in Figures 10 and 11. The flutes 56 of such a hob 57 may thus be ground with a conical grinding wheel 58 swung to the spiral angle "*s*" of the flutes. The axis 59 of the grinding wheel is inclined with respect to the plane of the paper in Figure 10 to present a grinding line 60 perpendicular to the paper. This line 60 is approximately the contact line between the grinding wheel and the face of a flute. Hob 57 when turned uniformly about its axis 61 is moved at a changing rate in the same direction as line 62 in accordance with the spiral of the flutes. In the case of logarithmic spiral flutes such as illustrated in Figure 9, hob 57 is moved at a rate proportional to the distance of the grinding line 60 from the apex of the hob. A successive position of the hob axis 61 is shown at 61', Figure 11. The motion of the hob is preferably guided by a master body 63 fixed on the hob spindle 61 and provided with the same flutes 66. A flute of body 63 contacts with a pin 64 positioned to engage body 63 along a line 65 corresponding to the grinding line 60 and corresponding in position on the master body.

If flutes of other than logarithmic spiral form are provided, a disk corresponding to the shape of grinding wheel 58 should be used instead of pin 64 because under such conditions wheel 58 will generally not grind along a fixed grinding line owing to the varying inclination of the flutes to the grinding wheel.

Figure 12 shows an actual hob adapted for accomplishing the method of the invention. Its cutting teeth 70, 71, 72, and 73, 74, 75, are arranged as shown in multiple threads. Cutting edges 76, 77, are formed on the teeth by flutes 78, 79, of the character described, and it is to be noted from Figures 9 and 12 that the number of flutes and the number of threads or starts preferably contain no common factor. Thus, the hob shown in Figure 12 has six threads and five flutes. It has been found that hobs so constructed apply a smoother finish than would a hob of six threads and six flutes, for example. Furthermore, it is preferred, in hobbing a blank, to use a hob with a number of threads having no factor in common with the number of teeth of a blank. Thus, the six threaded hob may be advantageously used to cut a blank of twenty-three or twenty-five teeth, but it is preferred to use a different hob for a blank of twenty-four teeth, since the latter number contains as a factor the number of threads (six) of the hob. A seven threaded hob for instance would afford better results for a blank of twenty-four teeth.

As shown in Figure 12, the cutting edges 76, 77, are curved and convex and the teeth are relieved back of the cutting faces to afford efficient cutting action. Figures 13 and 14 illustrate two different ways of applying relief to the teeth of a hob of the character described. In Figure 13 the dotted line 80 indicates the cutting edge after resharpening of the original edge shown in full line, following one method of relieving. It will be seen that the new edge 80 is located inwardly of the original edge 82, receding in a direction 83 substantially at right angles to pitch line 84. In Figure 14, on the other hand, there is shown a new edge 81 resulting from relieving the original edge 85 in a direction 86. Either kind of relief may be applied to the present hob. In cutting and in relieving the hob a suitably inclined tool is led along the pitch line 87, Figure 12, at a rate of advance varying with relation to the rotation of the hob and controlled for example by suitable cams in place of the usual lead screw.

The invention thus provides a rapid and practical hobbing method for cutting curved tooth tapered gears of an efficient character of design, by which method all of the teeth of the gear and both sides of each tooth are simultaneously shaped in one continuous cycle, the practical advantages of which are apparent to those skilled in the art. And while the invention has been described by reference to preferred modes of procedure, it is to be understood that such specific references and descriptions are intended merely by way of illustration and not as limitations, and that various modifications may be resorted to within the scope of the claims.

I claim as my invention:

1. The method of cutting gears which consists in selecting a taper hob of changing lead, the sine of whose cone angle is in the same proportion to sine of the cone angle of the blanks as the number of its threads bears to the number of teeth on the gear to be cut and in rotating the hob and blank in timed relation while imparting an additional relative movement between the hob and blank about the apex of the latter.

2. The method of cutting gears adapted to mesh interchangeably with a basic crown gear which consists in employing a hob of changing lead so proportioned in development relative to the crown gear that the ratio of the angular velocities of the developed hob and crown gear is inversely proportional to the ratio of the distances of the respective apices from the intersection of the perpendiculars to the hob spirals at the line of action, and in rotating the hob and blank in timed relation while imparting an additional relative movement between the hob and blank about the apex of the latter.

3. The method of cutting gears consisting in selecting a hob having a thread the perpendiculars to the pitch line of which, at the intersections thereof with a generatrix of the pitch surface of the hob, intersect in a point, positioning the hob with respect to a blank so that the hob apex, the blank apex and the said point of intersection lie in a straight line intersecting the axis of the hob at an acute angle, and rotating the hob and blank in timed relation while imparting an additional relative movement between the hob and blank about the apex of the latter.

4. The method of cutting curved tooth bevel gears adapted to mesh interchangeably with a basic crown gear having teeth of constant lead angle along a straight line offset from its apex, consisting in selecting a hob adapted to mesh with the crown gear along such a line and rotating the hob and blank in timed relation while imparting an additional relative movement between them about the apex of the blank.

5. The method of cutting curved tooth bevel gears consisting in positioning a hob so that a line perpendicular to the hob thread at the intersection thereof with a generatrix of the pitch surface of the hob is parallel to a line connecting the hob and blank apices and rotating the hob and blank in timed relation while imparting an additional relative movement between them about the apex of the blank.

6. The method of cutting gears consisting in employing a hob of changing lead whose pitch lines in development have a constant inclination to the line of action between the hob and blank to be cut and the same inclination as the pitch lines of the latter and in rotating the hob and blank in timed relation while imparting to them an additional relative movement about the apex of the blank.

7. The method of cutting gears adapted to mesh interchangeably with a basic crown gear consisting in employing a tapered hob of constant lead angle adapted to mesh with the crown gear along a line of action passing through the apex of the hob and in rotating the hob and blank in timed relation while imparting to them an additional relative movement about the apex of the blank in the manner of a gear meshing with said basic crown gear.

8. The method of hobbing bevel gears consisting in positioning a hob so that a perpendicular to its thread at the intersection thereof with the generatrix of its pitch surface is parallel to a line connecting the hob and blank apices and in rotating the hob and blank in timed relation while imparting to them an additional relative movement about the apex of the blank.

9. The method of hobbing bevel gears having teeth of changing spiral angle consisting in employing a hob of constant spiral angle and in rotating the hob and blank in timed relation while imparting to them an additional relative movement about the apex of the blank.

10. The method of cutting curved tooth bevel gears consisting in rotating a taper hob of changing lead in cutting engagement with a blank while imparting an additional relative movement between the hob and blank about the apex of the latter.

11. The method of cutting curved tooth bevel gears adapted to mesh interchangeably with a basic crown gear consisting in employing a hob having in development the same angular velocity as the basic crown gear and rotating the hob and blank in timed relation while imparting to them an additional relative movement about the apex of the blank.

12. The method of cutting curved tooth bevel gears adapted to mesh interchangeably with a basic crown gear consisting in employing a hob which in development rotates in the same direction and at the same angular velocity as the crown gear and in rotating the hob and blank in timed relation while imparting to them an additional relative movement about the apex of the blank.

13. The method of cutting curved tooth bevel gears consisting in selecting a multiple thread taper hob, the number of threads and cone angle of which bear a predetermined mathematical relation to the tooth number and cone angle of the gear to be cut, and in rotating the hob and blank in timed relation while imparting to them an additional relative movement about the apex of the blank.

14. The method of cutting gears consisting in rotating a hob of constant lead angle in continuous cutting engagement with a rotating blank while imparting an additional relative movement between the hob and blank about the apex of the latter.

15. The method of cutting gears consisting in rotating a taper hob of constant lead angle in continuous cutting engagement with a rotating blank while imparting an additional relative movement between the hob and blank about the apex of the latter.

16. The method of cutting gears consisting in positioning a taper hob of constant lead angle representing a basic crown gear of the system, relative to the blank to be cut, so that the pitch surfaces of hob and blank mesh along a line which passes through the apex of the hob, and in rotating the hob and blank in timed relation while imparting an additional relative movement between them about the apex of the blank and maintaining the apex of the hob outside a perpendicular from the center of said basic crown gear to the hob axis.

17. The method of cutting gears consisting in rotating a taper hob of constant lead angle in cutting engagement with a rotating blank while imparting to them an additional relative movement about the apex of the blank, and maintaining the hob apex in predetermined offset relation to the apex of the blank.

18. The method of cutting gears adapted to mesh interchangeably with a basic crown gear consisting in rotating a taper hob and blank in timed relation and imparting to them an additional relative movement about the apex of the blank while maintaining the angle between a line connecting the apices of the hob and blank and the projected hob axis equal to the lead angle of the hob.

19. The method of cutting gears adapted to mesh interchangeably with a basic crown gear consisting in employing a taper hob of changing lead whose pitch surfaces match those of the basic gear along a line passing through the apex of the hob and in rotating the hob and blank to be cut in timed relation while imparting to them an additional relative movement about the blank apex.

20. The method of cutting gears adapted to mesh interchangeaby with a basic crown gear consisting in rotating a taper hob and blank in timed relation and imparting to them an additional relative movement about the apex of the blank while maintaining the apex of the hob outside a line drawn from the center of said basic crown gear perpendicular to the projection of the hob axis.

21. The method of cutting gears adapted to mesh interchangeably with a basic crown gear consisting in employing a hob adapted in development to mesh with the basic gear with a ratio less than 5 to 1 and in rotating the hob and blank to be cut in timed relation while imparting to them an additional relative movement about the blank apex.

22. The method of cutting gears consisting in employing a taper hob having a cone angle determined in accordance with the formula $$\frac{\sin a_o}{\sin a} < \frac{5 N_o}{N}$$

where $a_o$ and $a$ are the cone angles of the hob and blank, respectively, and $N_o$ and $N$ their respective tooth numbers.

23. The method of cutting gears consisting in employing a taper hob the number of whose threads contains no factor in common with the number of teeth to be cut in the blank.

24. The method of cutting gears adapted to mesh interchangeably with a basic crown gear consisting in rotating a hob in continuous cutting engagement with a blank while imparting an additional relative movement between the hob and blank about the axis of the blank and maintaining the hob so positioned with respect to the basic gear axis that perpendiculars to the thread of the hob intersect at a point which lies outside of a line drawn from the basic gear center perpendicular to the hob axis.

25. The method of cutting gears consisting in selecting a hob, the perpendiculars to whose thread at the intersections thereof with a generatrix of its pitch surface intersect at a point, and in positioning the hob so that the said point of intersection and the apex of the blank lie at opposite sides of the hob axis in a line intersecting the latter at an acute angle.

26. The method of cutting curved tooth tapered gears which consists in rotating a taper hob of constant lead angle in engagement with a tapered gear blank, while imparting a relative movement between the hob and blank in the manner of a gear meshing with a crown gear to generate the tooth profiles.

27. The method of cutting a curved tooth tapered gear which consists in positioning a taper hob of constant lead angle with its axis offset from the axis of the blank and extending diagonally across the face of the blank and rotating the hob in continuous cutting engagement with the blank while imparting a relative movement between the hob and blank in the manner of a gear meshing with a crown gear to generate the tooth profiles.

ERNEST WILDHABER.